United States Patent [19]
Henrie

[11] 3,907,981
[45] Sept. 23, 1975

[54] METHOD FOR RECOMBINING HYDROGEN AND OXYGEN

[75] Inventor: James O. Henrie, Hidden Hills, Calif.

[73] Assignee: Rockwell International Corporation, El Segundo, Calif.

[22] Filed: Mar. 12, 1973

[21] Appl. No.: 340,148

[52] U.S. Cl. ............ 423/580; 23/230 A; 23/253 A; 23/281; 23/284
[51] Int. Cl............................................. C01b 5/00
[58] Field of Search....... 423/580; 23/230 R, 230 A; 176/37

[56] References Cited
UNITED STATES PATENTS

| | | | |
|---|---|---|---|
| 1,166,294 | 12/1915 | Winne................................ | 423/580 |
| 1,594,264 | 7/1926 | Howard............................ | 23/230 A |
| 2,590,436 | 3/1952 | Luten, Jr. ........................ | 23/230 A |
| 3,755,075 | 8/1973 | Henrie.................................. | 176/37 |
| 3,791,923 | 2/1974 | Bhan................................. | 176/37 |
| 3,853,482 | 12/1974 | Bhan................................. | 423/580 |

OTHER PUBLICATIONS
Ephraim: "Inorganic Chemistry," Sixth Edition – Revised, Interscience Publishers, Inc., New York, N.Y., (1958), pp. 415–416.

*Primary Examiner*—Oscar R. Vertiz
*Assistant Examiner*—Wayne A. Langel
*Attorney, Agent, or Firm*—C. E. DeLarvin; L. L. Humphries; H. Kolin

[57] ABSTRACT

A method and apparatus for thermally recombining hydrogen and oxygen comprising a heating chamber in which the gases to be combined are initially heated to a temperature above the threshold for thermal combination or recombination, a reaction chamber into which the heated gases are transferred from said heating chamber to complete the reaction and which is formed to mix previously reacted gases with the gases delivered from said heating chamber, and temperature control means responsive to the temperature in said reaction chamber for controlling the power to the said heating chamber.

5 Claims, 6 Drawing Figures

METHOD FOR RECOMBINING HYDROGEN AND OXYGEN

BACKGROUND OF THE INVENTION

1. Field of the Invention

This invention relates to chemical processing and is particularly directed to a method and apparatus for thermally recombining hydrogen and oxygen. However, the invention is not limited to the recombination of these two gases and the term "reactants" will be used to describe the broad family of combustible gases.

2. Prior Art

In numerous industrial processes, such as power generation, hydrogen or other combustible gases are produced from metal-water reactions, radiolytic decomposition of water, electrolysis, or other means which may constitute a fire or explosion hazard. These combustible gases may be associated with radioactive material or other pollutants which prevent them from being safely vented to the atmosphere. Accordingly, numerous techniques have been proposed, heretofore, for eliminating or recomining such gases. Unfortunately, many of the prior art techniques have been expensive or have required complex equipment that demands considerable maintenance. Thermal recombiners have been known heretofore. However, in the prior art thermal recombiners, the process gas is conventionally heated in a heating chamber to a temperature of about 1,200°F, whereupon reactants such as hydrogen and oxygen recombine spontaneously. This reaction is exothermic, causing a temperature rise of about 140°F for each percent of hydrogen contained in the process gas. Consequently, if the process gas contains as little as three percent hydrogen, the temperature in the reaction chamber will rise to about 1,600°F, which is above the tolerance limits of conventional materials used to form containment walls. With five percent hydrogen in air, the temperature would rise from about 1,200°F to about 1,900°F. Some exotic materials and techniques, developed in connection with nuclear and space research, may be able to withstand such temperatures. However, these exotic materials and techniques are extremely expensive, do not meet the generally recognized codes, and are often unsuitable for this purpose. Thus, none of the prior art techniques have been entirely satisfactory.

BRIEF SUMMARY AND OBJECTS OF INVENTION

The disadvantages of the prior art are overcome with the present invention and a method and apparatus are provided for thermally recombining hydrogen and oxygen at hydrogen concentrations well above 3 percent while maintaining containment wall temperatures well below 1,500°F, without external cooling, and, hence, permitting use of conventional materials.

The advantages of the present invention are preferably attained by providing a heating chamber in which the gases to be combined are initially heated to a temperature above the threshold for thermal recombination, a reaction chamber into which the heated gases are transferred from said heating chamber to complete the reaction and which is formed to mix previously reacted gases with the gases delivered from said heating chamber, and temperature control means responsive to the temperature in said reaction chamber for controlling the power to the heater of said heating chamber.

Accordingly, it is an object of the present invention to provide improved methods and apparatus for eliminating unwanted free hydrogen and oxygen from process exhaust gases.

Another object of the present invention is to provide improved methods and apparatus for thermally recombining hydrogen and oxygen.

A further object of the present invention is to provide methods and apparatus for thermally recombining hydrogen and oxygen in process gases containing over three percent hydrogen while permitting the use of conventional materials for containment walls.

An additional object of the present invention is to provide methods and apparatus for thermally recombining hydrogen and oxygen in process gases containing over three percent hydrogen while maintaining wall temperatures well below 1,500°F.

A specific object of the present invention is to provide methods and apparatus for thermally recombining hydrogen and oxygen, said apparatus comprising a heating chamber in which the gases to be combined are initially heated to a temperature above the threshold for thermal recombination, a reaction chamber into which the heated gases are transferred from the heating chamber to complete the reaction and which is formed to mix previously reacted gases with the gases delivered from said heating chamber, and temperature control means responsive to the temperature in said reaction chamber for controlling the temperature of said heating chamber.

These and other objects and features of the present invention will be apparent from the following detailed description, taken with reference to the accompanying drawing.

DETAILED DESCRIPTION OF INVENTION

Figure 1:
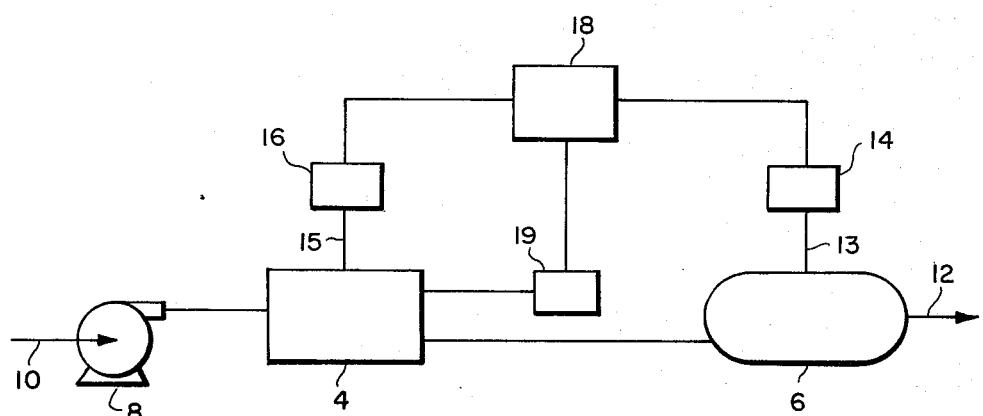
FIG. 1 is a diagrammatic representation of a thermal recombining system embodying the present invention.
Figure 2:
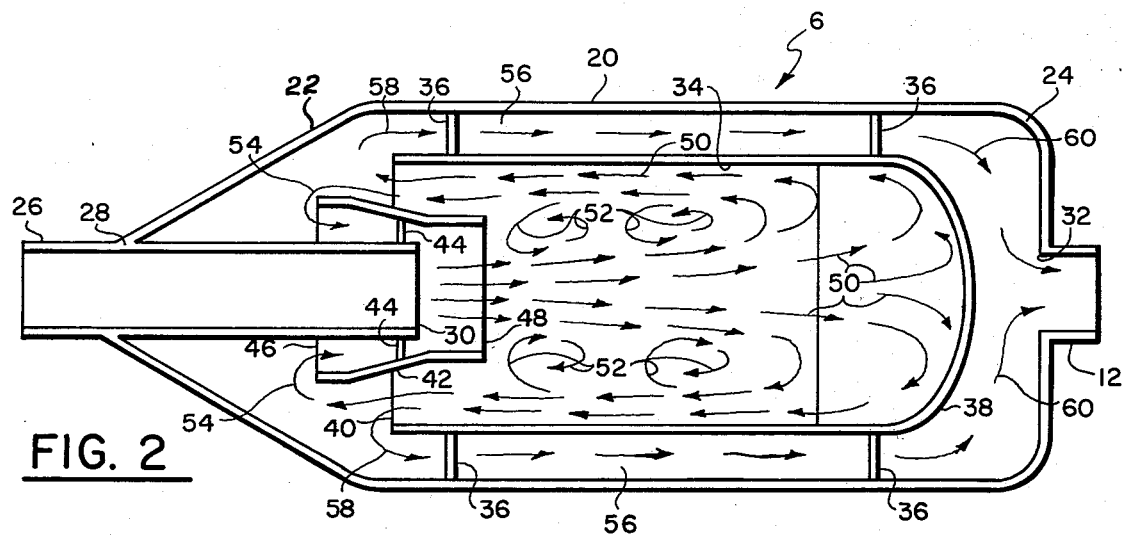
FIG. 2 is a longitudinal section through the reaction chamber 6 of the system of FIG. 1.

In that form of the present invention chosen for purposes of illustration in FIG. 1, a thermal recombining system is shown, which is comprised primarily of a heating chamber 4 and a reaction chamber 6. A blower 8, or equivalent device, receives process gases via inlet conduit 10 and delivers them through the heater 4 to the reaction chamber 6 and, thence, via outlet conduit 12 to an exhaust stack, recirculating system or other suitable means, not shown. The blower 8 and heater 4 may be conventional. However, the reaction chamber 6 is formed to receive the heated gases from the heater and to retain the gases therein for a time interval which is sufficient to allow the thermal recombination reaction and to mix previously reacted gases with the newly delivered gases from the heater 4, as seen in FIG. 2, causing a temperature rise which drives the reaction to completion. Finally, a temperature sensing probe 13 is mounted to project into the reaction chamber 6 and supplies signals to a suitable temperature control unit 14. The output signal from the temperature control unit 14 goes to an "auctioneer" circuit 18, which compares these signals with those from a similar temperature control unit 16 and temperature sensing probe 15, mounted to sense the temperature in the heater 4, and regulates the temperature of the heater 4 in response to these signals by suitable temperature regulating means 19.

As seen in FIG. 2, the reaction chamber 6 comprises a cylindrical outer shell 20 with end covers 22 and 24. An inlet conduit 26 projects through a suitable opening 28 in end 22 and extends a substantial distance axially into the interior of the shell 20 to form an inlet nozzle 30. The outlet conduit 12 is mounted in a similar opening 32 in end 24 of the shell 20 to carry off the reacted gases. A generally cup-shaped member 34 is mounted coaxially within the shell 20 by suitable means, such as legs 36, which support the member 34 but do not significantly interfere with the flow of gases thereabout. The cup-shaped member 34 is positioned with its closed end 38 adjacent to end 24 of the shell 20, while the open end 40 of the member 34 encircles the inlet nozzle 30. A generally frusto-conical shroud 42 also encircles the inlet nozzle 30 and is mounted thereon by suitable means, such as braces 44, which support the shroud 42 without significantly interfering with the flow of gases thereabout. The shroud 42 is open at both ends 46 and 48 and cooperates with the inlet nozzle 30 to form a venturi section to cause increased recirculation.

In use, process gases, containing free hydrogen and oxygen, are delivered by blower 8 into the heater 4 and are initially heated to a temperature of about 1,200°F, the threshold temperature for the thermal recombination reaction between hydrogen and oxygen. Once this reaction is initiated, the heated gases are transferred through inlet conduit 26 into the reaction chamber 6. Since the reaction is exothermic, the temperature of the gas rises and the reaction rate increases. As the reaction proceeds, the gases travel generally centrally in the cup-shaped member 34 from nozzle 30 toward end 38 of the cup-shaped member 34 and then move radially outward and counter-current to the central flow along the walls of the member 34 toward the open end 40, as indicated by arrows 50. The reacted, hot gases are mixed at 52 and 54 with the cold incoming gases to speed the reaction and also to dilute the reactants in the gas mixture. The length of the cup-shaped member 34 is made such that the thermal recombination reaction is substantially completed by the time the mixed gases have traveled through the chamber formed by member 34 and back to its open end 40. The exact dimensions of the member 34 are determined by the flow rate, the extent of the mixing and recirculation, and the selected control temperature of the reacted gases.

As indicated by arrows 52, the counter-current movement of the gases causes mixing of partially-reacted gases. Moreover, as indicated above, shroud 42 forms a venturi and the gases delivered through nozzle 30 create a low pressure area within the shroud 42. This serves to draw some of the completely reacted gases, as indicated by arrows 54, and causes these previously reacted gases to be mixed with the gases which are newly delivered through nozzle 30. The remainder of the completely reacted gases pass through the channel 56, formed between the outer shell 20 and the cup-shaped member 34, as indicated by arrows 58, and are exhausted through outlet conduit 12, as shown by arrows 60.

Because the thermal recombination reaction is exothermic, the temperature of the gases will increase as they travel through the cup-shaped member 34. At the same time, it must be remembered that the ultimate temperature which the gases can attain is related to their temperature at any time and the amount of reactants contained in the gas at that time. The mixing of the previously reacted gases with the newly delivered gases, shown by arrows 52 and 54, serves to raise the temperature of the newly delivered gases and to dilute the gases, thereby reducing the ratio of the reactants to the total quantity of gas. This mixing raises the gas temperature and hence the reaction rate, but the dilution also serves to restrict the ultimate temperature which the reaction can attain within reaction chamber 6. At the same time, the temperature sensing probe 13 is positioned to sense the temperature within the reaction chamber 6 adjacent the open end 40 of the cup-shaped member 34 where the reaction reaches completion and achieves its maximum temperature. If this maximum temperature exceeds a predetermined control value, such as 1,300°F to 1,400°F, the temperature controller 14 sends a signal to the "auctioneer" 18 which responds by actuating temperature regulating means (power controller) 19 to reduce the temperature in the heater 4.

It will be seen that after the thermal recombination reaction has been initiated in the heater 4, its temperature starts to rise, causing temperature controller 16 to exceed its setpoint, sending a signal to auctioneer 18, causing power controller 19 to reduce power to heater 4. This reduces heater temperatures, causing the reaction to move downstream into reaction chamber 6, where it proceeds to completion. The reaction chamber temperature increases until temperature controller 14 reaches its set point and causes the power to heater 4 to be further decreased. The mixing of the previously reacted gases with the newly delivered lower temperature gases serves to raise the temperature of the mixture sufficiently to stably continue the reaction in reaction chamber 6. The temperature of the process gas leaving the heater 4 may be reduced several hundred degrees depending on reactant concentrations, without interrupting the reaction. The actual amount of increase in temperature of the process gas after it leaves heater 4 until it is reacted in reaction chamber 6 will be directly proportional to the amount of reactants contained in the process gas.

In practice, for gases having low hydrogen concentrations (below about 2%), the heater gas exit temperature is controlled at about 1,300°F, and much of the reaction takes place in the heater. For gases containing more than about 2% hydrogen, the heater gas exit temperature is first controlled at about 1,200°F. At this point some of the reaction takes place in the heater and some in the reaction chamber. As the gas temperature in the heating chamber 4 or in the reaction chamber 6 increase to either of their respective control set points, the ocntroller 19 reduces heater power and allows the gas in the heater 4 to cool. This stops the reaction in the heater 4 and forces the entire reaction to take place in the reaction chamber 6. The heater 4 is controlled by the heater gas temperature probe 15 located near the heater exit and also by the reaction chamber gas temperature probe 13. The selection is accomplished by means of a standard "auctioneer" circuit 18. For hydrogen concentrations of about 4%, the reaction chamber temperature is controlled at about 1,300°F and the heater gas exit temperature is automatically reduced to about 750°F. For higher concentrations of hydrogen, the reaction chamber temperature is controlled at about 1,380°F.

Figure 3:
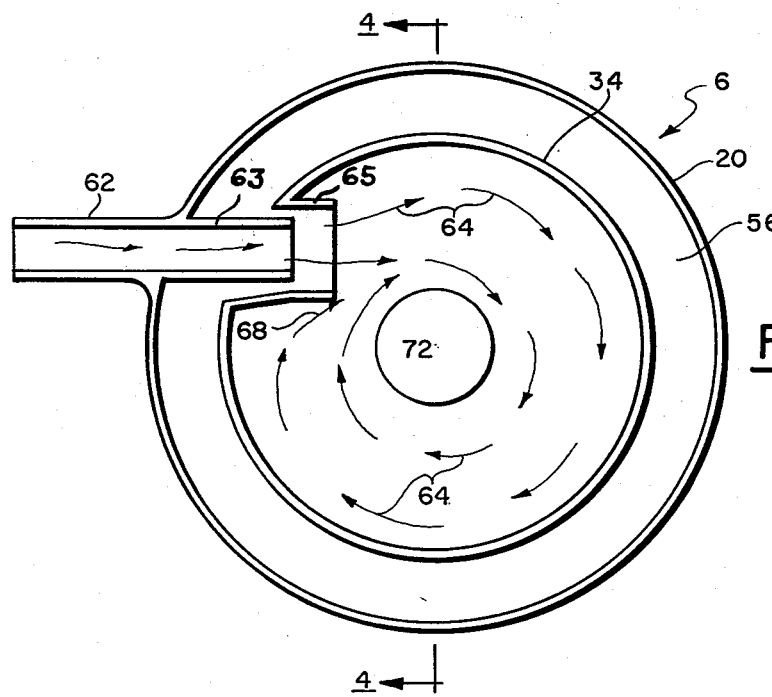
FIG. 3 is a transverse section through an alternative form of the reaction chamber of FIG. 2.
Figure 4:
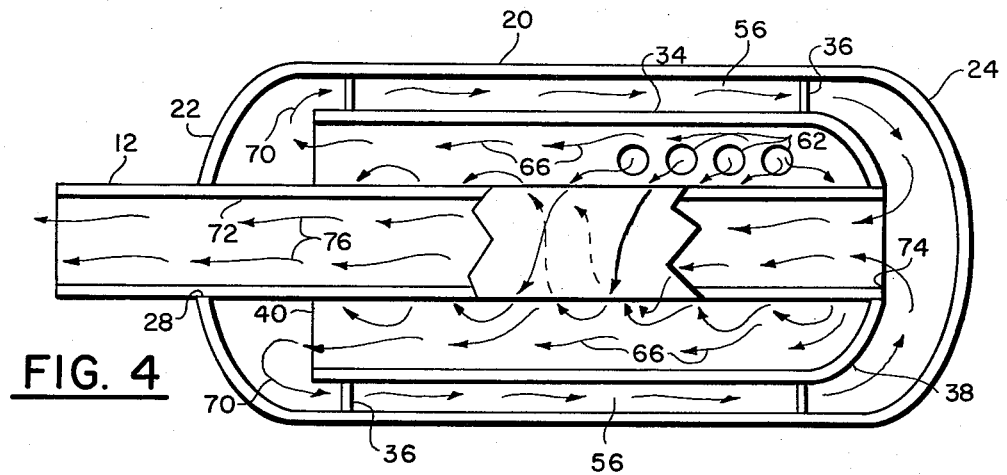
FIG. 4 is a longitudinal section taken along the lines 4—4 of the reaction chamber of FIG. 3.

FIGS. 3 and 4 illustrate an alternative form of the reaction chamber 6 of FIG. 2. In this form, the outer shell 20 and cup-shaped member 34 are similar to those of FIG. 2. However, a plurality of inlet conduits 62 are provided and project substantially tangentially through the outer shell 20 to communicate with the interior of the cup-shaped member 34 adjacent end 38 thereof. If desired, a venturi shroud, similar to the shroud 42 of FIG. 2, may be disposed about the nozzles 63 of the inlet conduits 62, as seen at 65, to facilitate mixing. The gas delivered by the inlet conduits 62 will travel in a helical path, flowing circumferentially about the cup-shaped member 34, as indicated by arrows 64 in FIG. 3, while moving gradually from the closed end 38 of the cup-shaped member 34 toward the open end 40, as indicated by arrows 66 in FIG. 4. Preferably, the dimensions of the cup-shaped member 34 are such that the thermal recombination reaction can substantially reach completion as the gases delivered by the inlet conduits 62 make a single revolution about the cup-shaped member 34. Thus, upon returning to the vicinity of the inlet conduits 62, the previously-reacted gases mix with the newly-delivered gases, as indicated by arrow 68 in FIG. 3, to increase the temperature and dilute the hydrogen concentration of the newly-delivered gases in a manner similar to that accomplished by the countercurrent flow and shroud 42 of the device of FIG. 2.

Upon reaching the open end 40 of the cup-shaped member 34, the gases flow radially outwardly, as indicated by arrows 70, and through channel 56, formed between the outer shell 20 and the cup-shaped member 34, toward end 24 of the outer shell 20. As shown, the outlet conduit 12 projects through opening 28 in end 22 of the outer shell 20 and communicates with a hollow central core 72 which extends axially the entire length of the cup-shaped member 34, and communicates with the space between end 38 of the cup-shaped member 34 and end 24 of the outer shell 20 through a suitable opening 74 formed in end 38 of the cup-shaped member 34. Thus, after passing through channel 56, the gases would flow radially inward and, thence, through core 72 to outlet conduit 12, as indicated by arrows 76.

Figure 5:
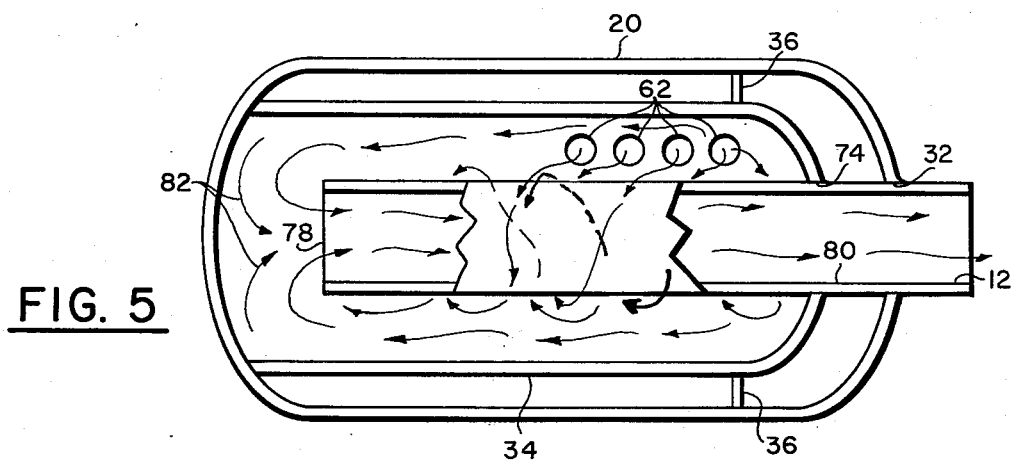
FIG. 5 is a longitudinal section through a further alternative form of the reaction chamber of FIG. 2.
Figure 6:
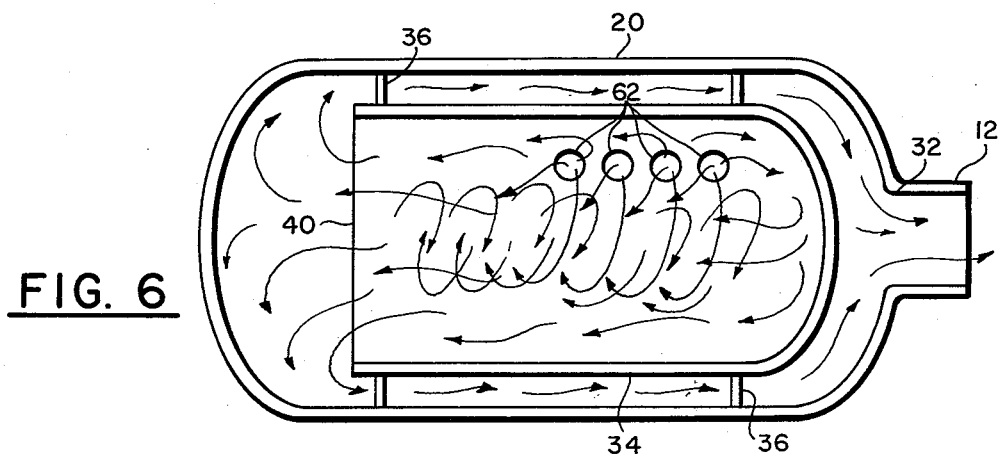
FIG. 6 is a longitudinal section through another alternative form of the reaction chamber of FIG. 2.

Alternatively, if desired, opening 28 in end 22 of the outer shell 20 could be closed as seen in FIG. 5, and the core 72 could be terminated adjacent open end 40 of the cup-shaped member 34, as indicated at 78 in FIG. 5, and could be extended through opening 74, as indicated at 80, to communicate with outlet conduit 12 through an opening, such as opening 32 of FIG. 2, formed in end 24 of the outer shell. With this arrangement, the operation would be substantially the same as that described above for FIGS. 3 and 4. However, upon reaching the open end 40 of the cup-shaped member 34, the gases would flow radially inward and, thence, through core 72 in the direction shown by the arrows 82. As a further alternative, opening 28 of end 22 of the outer shell 20 could be closed, as seen in FIG. 6, as well as opening 74 in end 38 of the cup-shaped member 34, and the core 72 could be omitted. Outlet conduit 12 could be mounted in the manner shown in FIG. 2. This arrangement would function in substantially the same manner as described above for FIG. 3. However, upon passing through channel 56, the gases would be exhausted through end 24 of the outer shell 20, in the manner described with respect to FIG. 2.

Obviously, numerous other variations and modifications may be made without departing from the present invention. Accordingly, it should be clearly understood that the forms of the present invention described above and shown in the accompanying drawing are illustrative only and are not intended to limit the scope of the present invention.

What is claimed is:

1. A continuous method of thermally recombining oxygen and hydrogen comprising the steps of
   a. passing a stream of gas containing free oxygen and hydrogen through a first chamber,
   b. initially heating the gas in the first chamber to a temperature above the threshold temperature for thermal recombination to initiate a thermal recombination reaction,
   c. transferring the gas from the first chamber into a second chamber and redirecting the gas in a direction countercurrent to the gases coming into the second chamber,
   d. exhausting some of the redirected gases from the second chamber,
   e. mixing the remainder of redirected gases with the gases being transferred from the first chamber into the second chamber to heat the transferred gases,
   f. providing a temperature sensing means in the second chamber for sensing the temperature therein, and
   g. substantially maintaining a desired temperature in the second chamber such that substantially all of the recombination reaction takes place in the second chamber, said desired temperature being maintained by controlling the temperature in step (b) in response to the temperature sensed in the second chamber.

2. The method of claim 1 wherein in step (b) the gas initially is heated to a temperature above 1,200°F.

3. The method of claim 1 wherein in step (g) the desired temperature is below 1,500°F.

4. The method of claim 1 wherein in step (g) the desired temperature is from 1,300° to 1,400°F.

5. The method of claim 4 wherein in step (b) the gas initially is heated to a temperature above 1,200°F.

* * * * *